US009284621B2

(12) United States Patent
Eaton

(10) Patent No.: US 9,284,621 B2
(45) Date of Patent: Mar. 15, 2016

(54) PROCESSING OF SULFATE AND/OR SULFIDE-RICH WASTE USING $CO_2$-ENRICHED GASES TO SEQUESTER $CO_2$, REDUCE ENVIRONMENTAL IMPACTS INCLUDING ACID ROCK DRAINAGE AND PRODUCE REACTION PRODUCTS

(71) Applicant: Strategic Metals Ltd., Vancouver (CA)

(72) Inventor: William Douglas Eaton, North Vancouver (CA)

(73) Assignee: Strategic Metals Ltd., Vancouver (CA)

( * ) Notice: Subject to any disclaimer, the term of this patent is extended or adjusted under 35 U.S.C. 154(b) by 178 days.

(21) Appl. No.: 14/071,252

(22) Filed: Nov. 4, 2013

(65) Prior Publication Data
US 2014/0127094 A1   May 8, 2014

Related U.S. Application Data

(60) Provisional application No. 61/722,053, filed on Nov. 2, 2012.

(51) Int. Cl.
*A62D 3/30* (2007.01)
*A62D 3/38* (2007.01)
(Continued)

(52) U.S. Cl.
CPC . *C22B 5/08* (2013.01); *B01D 53/62* (2013.01); *B01D 53/73* (2013.01); *B09B 3/00* (2013.01); *B09B 5/00* (2013.01); *C22B 13/025* (2013.01); (Continued)

(58) Field of Classification Search
CPC .............. B09B 5/00; B09B 3/00; C22B 5/12; A62D 3/30; A62D 3/38; A62D 2101/40; A62D 2101/43; C02F 2103/10
See application file for complete search history.

(56) References Cited

U.S. PATENT DOCUMENTS 4,721,526 A    1/1988  Elmore et al.
4,950,409 A *  8/1990  Stanforth ................. 405/129.25
(Continued)

FOREIGN PATENT DOCUMENTS

CN     102059038 A      5/2011
DE     10130791 A1 *    2/2003 ................ C02F 1/66
(Continued)

OTHER PUBLICATIONS

Bénézeth, P. et al., "Solubility product of siderite ($FeCO_3$) as a function of temperature (25-250 °C)," *Chemical Geology*, 2009, vol. 268, pp. 3-12.
(Continued)

*Primary Examiner* — Timothy Vanoy
(74) *Attorney, Agent, or Firm* — Morgan, Lewis & Bockius LLP

(57) ABSTRACT

A process is provided for stabilizing a sulfate and/or sulfide-rich waste material, comprising metal sulfide minerals, and sequestering $CO_2$ comprises exposing the material to a $CO_2$-enriched gas mixture, reacting the $CO_2$-enriched gas mixture with the metal sulfide minerals and forming a $CO_2$-depleted gas mixture and a carbon-containing compound and at least one product selected from the group consisting of a purified metal or a metal-rich compound suitable for smelting or refining, sulfuric acid, sulfur and sulfurous acid, and system and apparatus therefor.

21 Claims, 5 Drawing Sheets

(51) Int. Cl.
| | |
|---|---|
| B09B 3/00 | (2006.01) |
| B09B 5/00 | (2006.01) |
| C22B 5/08 | (2006.01) |
| C22B 13/02 | (2006.01) |
| C22B 15/00 | (2006.01) |
| C22B 19/20 | (2006.01) |
| B01D 53/62 | (2006.01) |
| B01D 53/73 | (2006.01) |

(52) U.S. Cl.
CPC ............... *C22B 15/00* (2013.01); *C22B 19/20* (2013.01); *B01D 2257/302* (2013.01); *B01D 2257/504* (2013.01); *B01D 2258/0283* (2013.01); *Y02C 10/04* (2013.01); *Y02W 30/20* (2015.05)

(56) References Cited

U.S. PATENT DOCUMENTS

| | | | |
|---|---|---|---|
| 6,991,405 B2* | 1/2006 | Barrie et al. | 405/129.25 |
| 7,771,684 B2 | 8/2010 | Constantz et al. | |
| 7,919,064 B2 | 4/2011 | Kawatra et al. | |
| 8,840,793 B2* | 9/2014 | Bratty et al. | 210/664 |
| 2003/0132166 A1* | 7/2003 | Rey | 210/696 |
| 2007/0031311 A1 | 2/2007 | Anthony et al. | |
| 2009/0081095 A1 | 3/2009 | Wasas | |
| 2010/0282686 A1* | 11/2010 | Sharkey et al. | 210/709 |
| 2011/0035154 A1 | 2/2011 | Kendall et al. | |
| 2011/0158873 A1 | 6/2011 | Riman et al. | |
| 2011/0300045 A1 | 12/2011 | Jang et al. | |
| 2012/0031303 A1 | 2/2012 | Constantz et al. | |
| 2012/0193296 A1* | 8/2012 | Bhaduri et al. | 210/724 |
| 2014/0007795 A1* | 1/2014 | Moffett et al. | 106/627 |
| 2014/0034575 A1* | 2/2014 | Bratty | B01J 41/043 210/638 |
| 2014/0251914 A1* | 9/2014 | Ball et al. | 210/667 |

FOREIGN PATENT DOCUMENTS

| | | | | |
|---|---|---|---|---|
| EP | 1 987 896 A2 | 11/2008 | | |
| GB | 126951 | 1/1920 | | |
| GB | 126951 A | * 1/1920 | | C22B 5/00 |
| IN | 134884 | 11/1919 | | |
| WO | WO 2007/024218 A1 | 3/2007 | | |
| WO | WO 2011/047070 A1 | 4/2011 | | |

OTHER PUBLICATIONS

Bigham, J.M. et al., "Iron and Aluminum Hydroxysulfates from Acid Sulfate Waters," *Reviews in Mineralogy and Geochemisty*, 2000, vol. 40, pp. 351-403.

Chokshi, K. et al., "Iron Carbonate Scale Growth and the Effect of Inhibition in $CO_2$ Corrosion of Mild Steel," *Proceedings of the NACE Corrosion/2005 Conference Houston, USA*, Paper 05285, 2005, pp. 1-23.

Fowler, T.A. et al., "Mechanism of Pyrite Dissolution in the Presence of *Thiobacillus ferrooxidans*," *Applied and Environmental Microbiology*, Jul. 1999, vol. 65, No. 7, pp. 2987-2993.

Goldberg, P. et al., "$CO_2$ Mineral Sequestration Studies in US," *Proceedings of the First National Conference on Carbon Sequestration*, May 14-17, 2011, Washington, DC, pp. 1-10.

Hangx, S.J.T., "Subsurface mineralisation: Rate of $CO_2$ mineralisation and geomechanical effects on host and seal formations; Behaviour of the $CO_2$-$H_2O$ system and preliminary mineralisation model and experiments," *CATO Workpackage WP 4.1*, 2005, pp. 1-43.

Holzheid, A. et al., "Iron sulfide stoichiometry as a monitor of sulfur fugacity in gas-mixing experiments," *American Mineralogist*, 2013, vol. 98, pp. 1487-1496.

Hu, G. et al., "Decomposition and oxidation of pyrite," *Progress in Energy and Combustion Science*, 2006, vol. 32, pp. 295-314.

International Search Report mailed May 3, 2012, for International Patent Application No. PCT/CA2012/000045, 4 pages.

Kharaka, Y.K. et al., "Gas-water-rock interactions in sedimentary basins: $CO_2$ sequestration in the Frio Formation, Texas, USA," *Journal of Geochemical Exploration*, 2006, vol. 89, pp. 183-186.

Laajalehto, K. et al., "STM and XPS investigation of reaction of galena in air," *Applied Surface Science*, 1993, vol. 64, pp. 29-39.

Murphy, R. et al., "Ferrihydrite phase transformation in the presence of aqueous sulfide and supercritical $CO_2$," *Chemical Geology*, 2010, vol. 271, pp. 26-30.

Murphy, R. et al., "Hematite reactivity with supercritical $CO_2$ and aqueous sulfide," *Chemical Geology*, 2011, vol. 283, pp. 210-217.

Nafday, O.A. et al., "Iron Carbonate Scale Formation and $CO_2$ Corrosion in the Presence of Acetic Acid, Paper No. 05295," *Proceedings of the NACE Corrosion/2005 Conference*, Houston, USA, pp. 1-27.

Palandri, J.L. et al., "Reconstruction of in situ composition of sedimentary formation waters," *Geochimica et Cosmoschimica Acta*, 2001, vol. 65, No. 11, pp. 1741-1767.

Palandri, J.L. et al., "Experimental Studies of $CO_2$ Sequestration in Ferric Iron-Bearing Sediments: $CO_2$-$SO_2$ Reaction with Hematite," 2004, USGS, Menlo Park, CA, USA, pp. 1-10.

Palandri, J.L. et al., "Ferric iron in sediments as a novel $CO_2$ mineral trap: $CO_2$-$SO_2$ reaction with hematite," *Applied Geochemistry*, 2005, vol. 20, pp. 2038-2048.

Palandri, J.L. et al., "Ferric iron-bearing sediments as a mineral trap for $CO_2$ sequestration: Iron reduction using sulfur-bearing waste gas," *Chemical Geology*, 2005, vol. 217, pp. 351-364.

Rimstidt, J.D. et al., "Pyrite oxidation: A state-of-the-art assessment of the reaction mechanism," *Geochimica et Cosmoschimica Acta*, 2003, vol. 67, pp. 873-880.

Roh, Y. et al., "Biogeochemical and Environmental Factors in Fe Biomineralization: Magnetite and Siderite Formation," *Clays and Clay Minerals*, 2003, vol. 51, No. 1, pp. 83-95.

Spigarelli, B.P. et al., "Increased carbon dioxide absorption rates in carbonate solutions through surfactant addition," *Minerals & Metalurigcal Processing*, May 2013, vol. 30, No. 2, pp. 95-99.

Sun, W. et al., "A Study of Protective Iron Carbonate Scale Formation in $CO_2$ Corrosion," *Proceedings of AIChE Annual Meeting*, Nov. 7-12, 2004, 9 pages.

Sun, W. et al., "Basics Revisited: Kinetics of Iron Carbonate Scale Precipitation in $CO_2$ Corrosion, Paper No. 06365," *Proceedings of the NACE Corrosion/2006 Conference*, Houston, USA, pp. 1-21.

Anonymous, "Sulphate and salt minerals: the problem of treating mine waste," *Mining Environmental Management*, May 2000, pp. 11-13.

European Search Report for European Patent Application No. 13191474.9 mailed Nov. 17, 2015, 3 pages.

* cited by examiner

PROCESSING OF SULFATE AND/OR SULFIDE-RICH WASTE USING $CO_2$-ENRICHED GASES TO SEQUESTER $CO_2$, REDUCE ENVIRONMENTAL IMPACTS INCLUDING ACID ROCK DRAINAGE AND PRODUCE REACTION PRODUCTS

CROSS REFERENCE TO RELATED APPLICATION

This Application claims priority to U.S. Provisional Patent Application No. 61/722,053, filed Nov. 2, 2012, entitled "Processing of Sulfate and/or Sulfide-Rich Waste Using $CO_2$-Enriched Gases to Sequester $CO_2$, Reduce Environmental Impacts Including Acid Rock Drainage, and Produce Valuable Reaction Product" which is hereby incorporated by reference herein in its entirety.

TECHNICAL FIELD

This invention relates to the field of processing mine waste and recovery of valued products.

BACKGROUND

Mining is an essential industry, producing many valuable commodities that form the basis of the world economy, but with a history of negative environmental consequences. Mine waste streams from projects with sulfide ores are particularly detrimental, as both unprocessed waste rock and processed tailings material typically contain significant amounts of unoxidized or partially oxidized sulfide minerals. These minerals, over time, will react with water and atmospheric oxygen to create sulfuric acid and dissolved metals, a problem known as Acid Rock Drainage or Acid Mine Drainage. This can contaminate waterways and groundwater, leaving a long-term environmental problem.

Acid Rock Drainage (ARD) from mine waste rock, tailings, and mine structures such as open pits and underground workings is primarily a function of the mineralogy and permeability of the rock material and, as noted above, the availability of water and oxygen. ARD occurs naturally and as consequence of various mine activities. ARD, within this context of mining activity, may be referred to as Acid Mine Drainage (AMD), a subset of ARD.

Within a mine site, as field conditions during operation and long term storage are highly variable and difficult to assess in advance, predicting the potential for ARD is currently challenging, expensive, and of questionable reliability. ARD from mining operations is a costly problem and one in which both mine operators and governments alike are seeking solutions. In addition to the acid contribution to surface waters, ARD may cause metals such as arsenic, cadmium, copper, lead, mercury, and zinc to leach from mine wastes. This metal load causes environmental damage, and may be of greater concern than the acidity in environmental terms. Despite rigorous engineering and design, impoundment and treatment of acidic metal-bearing waters and/or sulfide-bearing materials can be compromised by human error, mechanical breakdowns, unrecognized geological features or extreme weather events.

Wastes that have the potential to generate acid as a result of mining activity include mined material such as tailings, waste rock piles or dumps, and spent ore from heap leach operations. While not mined wastes, pit walls of surface mining operations, mineralized areas left in underground mines and stockpiled ore also have the potential to generate ARD.

Simply put, acid is generated when metal sulfide minerals are oxidized. Metal sulfide minerals are present in ore bodies and surrounding host rocks at many mines and un-mined mineral prospects. Oxidation of these minerals and the formation of sulfuric acid occurs through natural weathering processes, however the oxidation rates of undisturbed ore bodies and release of acid and mobilization of metals is usually slow due to low permeability and natural buffering reactions. Thus, discharge from such undisturbed deposits poses limited threat to receiving aquatic ecosystems, which have usually adapted to the naturally elevated levels of ARD components if present.

Extraction operations associated with mining activity can greatly increase the rate of these oxidation reactions by exposing large volumes of sulfide-bearing rock material, with increased surface area, to air and water. The oxidation of sulfide minerals consists of numerous reactions and each type of sulfide mineral has a different oxidation rate. For example, pyrrhotite, marcasite and framboidal pyrite will oxidize quickly while crystalline pyrite will usually oxidize more slowly. Common sulfide minerals are identified in Table 1.

TABLE 1

Partial List of Sulfide Minerals[1]

| Mineral | Composition |
| --- | --- |
| Pyrite | $FeS_2$ |
| Marcasite | $FeS_2$ |
| Chalcopyrite | $CuFeS_2$ |
| Chalcocite | $Cu_2S$ |
| Sphalerite | $ZnS$ |
| Galena | $PbS$ |
| Millerite | $NiS$ |
| Pyrrhotite | $Fe_{1-x}S$ (where $0 < x < 0.2$) |
| Arsenopyrite | $FeAsS$ |
| Cinnabar | $HgS$ |

[1]Ferguson, K. D. and P. M. Erickson, 1988. Pre-Mine Prediction of Acid Mine Drainage. In: Dredged Material and Mine Tailings. Edited by Dr. Willem Salomons and Professor Dr. Ulrich Forstner. Copyright by Springer-Verlag Berlin Heidelberg 1988.

The primary factors governing acid generation include the particular sulfide minerals present, moisture content, oxygen levels, permeability, ambient temperature, concentration of ferric iron, and in some cases the presence of bacteria which can catalyze the oxidation reactions. Also important is the physical occurrence/type of sulfide mineral. Large, well crystallized (euhedral) minerals have smaller exposed surface areas than a similar volume of irregularly shaped, finer grained minerals, and thus react less rapidly.

Furthermore, as ARD contains sulphuric acid, the pH of the contaminated runoff, (runoff that stems from contact between sulphide minerals and exposure to air and water) continues to decrease with ongoing sulphide oxidation. Under these low pH conditions, ferric sulphate may be oxidized to ferric iron, which is capable of oxidizing other minerals such as lead, copper, zinc or cadmium sulphides. As a result, ARD frequently contains high concentrations of toxic dissolved metals.

It is clear that both water and oxygen are necessary to generate acid drainage. Water serves as both a reactant and a mechanism for transporting oxygen and aqueous products. A ready supply of atmospheric oxygen is required to drive the oxidation reaction.

Mitigation of ARD is often performed by immersing waste products in water, or capping them with an impermeable layer, both of which are intended to prevent oxygen from reaching the reactive materials. These methods are expensive, and require on-going maintenance and oversight for decades after a project ceases operation. The risk of long-term environmental damage and cost of a decommissioning project can be greatly decreased by a process which more rapidly converts all or most of the sulfide minerals to chemically stable forms. There is a need for a better, more efficient and more economical process.

Active mine projects are also significant consumers of electricity, with beneficiation processes in particular being energy intensive, and they often require heat for buildings or processing steps. Many former mine sites are still connected to electrical grids by under-utilized transmission lines. In many regions there is not enough existing generating capacity to supply electrical power demand of mines and grids to which they are connected, and new thermal power plants are planned to satisfy this demand. Power and heating plants often burn hydrocarbons such as coal, oil, or natural gas, which produce emissions that contain significant amounts of $CO_2$, a known greenhouse gas. $CO_2$ sequestration, a process by which $CO_2$ is locked away in a form which removes it from the atmosphere, is becoming increasingly important as governments world-wide become concerned about climate change.

The Faro Mine in Yukon, Canada, is one example of a site left in an environmentally unsound state when the operator went bankrupt. This project is currently being decommissioned and is expected to cost the Canadian Federal government over $700M to clean-up over a period of 25 years. The Faro clean-up includes capping all reactive waste under impermeable covers which will prevent oxygen from reaching it. If these covers are ever damaged, the material will begin to react again. A means to accelerate this process in a controlled environment would be hugely beneficial.

Accordingly there is a need across varying mining industries, for a treatment system, in particular one that is adaptable to in situ operation and wherein sulfide-rich waste is treated to reduce environmental impacts including ARD and wherein valuable reaction products are also obtained.

It is an object of the present invention to obviate or mitigate all of the above-noted disadvantages.

SUMMARY OF THE INVENTION

The invention provides, in one aspect, a means to process sulfate and/or sulfide-rich mine and industrial waste using a $CO_2$-enriched gas mixture, therein to eliminate or reduce the waste's ARD and/or metal leaching properties and concomitantly to produce carbonate minerals which sequester $CO_2$.

In another aspect, there is provided a process for stabilizing a sulfate and/or sulfide-rich waste material (comprising metal sulfide minerals) which comprises exposing the waste material to a $CO_2$-enriched gas mixture, reacting the $CO_2$-enriched gas mixture with the metal sulfide minerals and forming a $CO_2$-depleted gas mixture, a carbonate-containing compound and at least one product selected from the group consisting of a purified metal (or a metal-rich compound suitable for smelting or refining), sulfuric acid, sulfur, hydrogen sulfide, sulfur dioxide, sulfur trioxide and sulfurous acid.

In another aspect, the process of the present invention comprises: (a) contacting a sulfate and/or sulfide-rich waste with a $CO_2$-enriched gas mixture in a reaction zone to produce reaction mixture; (b) recovering from the reaction mixture metal by-products; and (c) separating and recovering sulfuric acid, sulfurous acid, hydrogen sulfide, sulfur dioxide, sulfur trioxide and/or elemental sulfur from the reaction mixture.

The present invention provides, in another aspect, an apparatus for processing sulfate and/or sulfide-rich mine and industrial waste that includes: (a) a reaction zone comprising mine or industrial waste wherein the waste comprises at least one of uncrushed, crushed or ground waste rock, dry tailings, wet tailings, or other materials rich in sulfide minerals; (b) a feed line into the reaction zone, for delivery of a $CO_2$-enriched gas mixture; (c) a feed line for water and other reactants; and (d) means to separate solid and liquid reacted products.

The present invention provides, in another aspect, a processing system for stabilizing a sulfate and/or sulfide-rich waste material (comprising metal sulfide minerals) comprising: a supply of at least some carbon dioxide emissions from a carbon dioxide source; said supply configured to contain at least some of said carbon dioxide emissions from said carbon dioxide source; at least one processing reactor configured to receive said at least some of said carbon dioxide emissions from said carbon dioxide source; said reactor also receiving mine or industrial waste wherein the waste comprises at least one of uncrushed, crushed or ground waste rock, dry tailings, wet tailings, or other materials rich in sulfide minerals.

The present invention also provides a method for treating ARD which comprises the steps of a) contacting a source of the ARD with a $CO_2$-enriched gas mixture in a reaction zone to produce reaction mixture; (b) recovering from the reaction mixture metal by-products; and (c) separating and recovering sulfuric acid, sulfurous acid, hydrogen sulfide, sulfur dioxide, sulfur trioxide and/or elemental sulfur from the reaction mixture.

This process effectively: (a) treats unreacted sulfate and sulfide-rich mine and industrial waste materials, (b) reduces or eliminates the ARD potential of unreacted sulfate and sulfide-rich waste materials, (c) reduces or eliminates the metal leaching potential of unreacted sulfate and sulfide-rich waste materials, (d) produces valuable metal products, (e) consumes $CO_2$ from a power plant, lime kiln, cement plant or other $CO_2$ emitting source, (f) sequesters $CO_2$ in the form of chemically stable carbonate minerals, (g) improves the environmental performance of a mine or industrial site, (h) improves the environmental performance of a hydrocarbon-fueled electrical power generation facility, heating plant, lime kiln, cement plant or other $CO_2$-generating industrial process, (i) allows for cleanup of historical non-operating mine or industrial sites, (j) produces valuable concentrated sulfuric or sulfurous acid, (k) collects and removes gaseous hydrogen sulfide, sulfur dioxide and/or sulfur trioxide for conversion to valuable concentrated sulfuric or sulfurous acid or elemental sulfur (l) produces valuable elemental sulfur, and (m) produces valuable metals or metal-rich compounds, or any combination thereof.

In sum, the process of the invention converts all or substantially all of the reactive sulfide minerals (also referred to herein as metal sulfide minerals) to chemically stable forms while at the same time sequesters $CO_2$. The uses on various wastes are beneficial and extensive. For example, accelerated reaction of waste material stored in tailings dams and waste piles using $CO_2$-enriched gases to produce inert material is a highly desirable environmental solution.

An ancillary yet key aspect of the process is that the $CO_2$-enriched gas mixture used for conversion of the sulfide minerals may be used directly from hydrocarbon burning operations or other $CO_2$-producing industrial processes, thereby significantly reducing the greenhouse gas emissions of such operations.

BRIEF DESCRIPTION OF THE DRAWINGS

Embodiments of the invention are best understood by referring to the following description and accompanying drawings which illustrate such embodiments. In the drawings.

Figure 1:
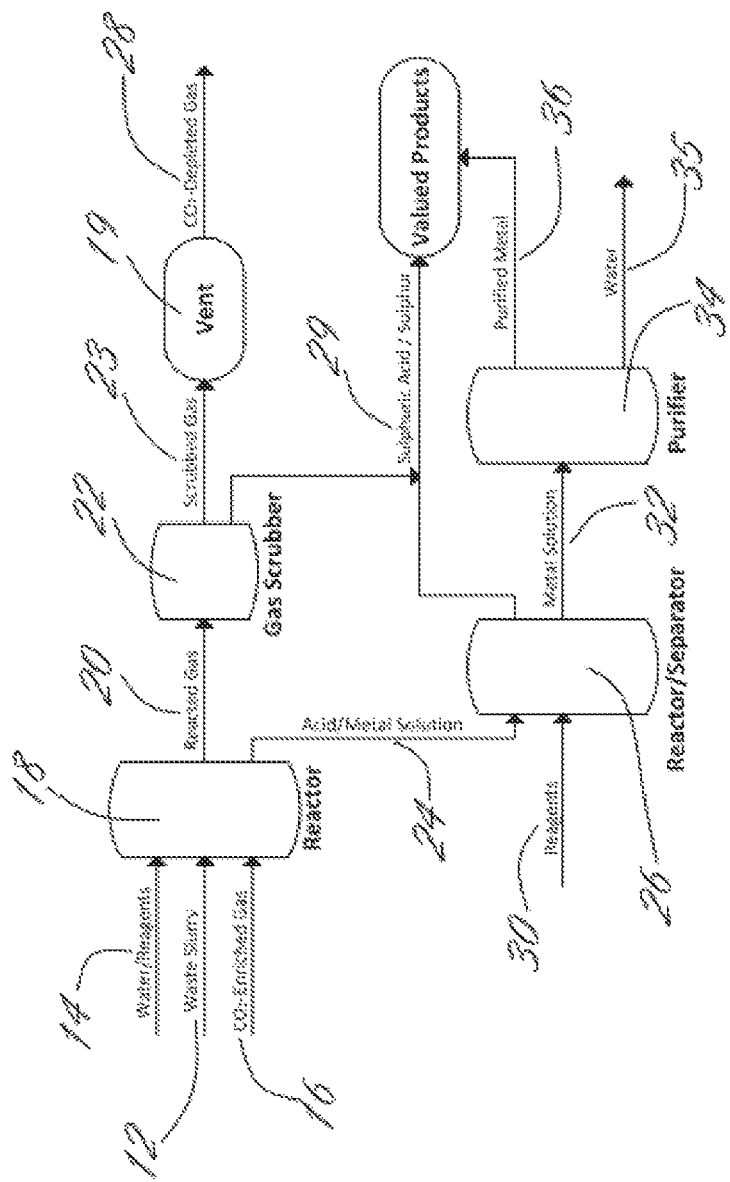
FIG. 1 illustrates a block flow diagram depicting the reaction of a $CO_2$-enriched gas mixture with mine and industrial waste products which are in slurry form, with the recovery of $H_2SO_4$, $H_2S$, $SO_2$, $SO_3$, elemental sulfur and metal products, and the sequestration of $CO_2$ in carbonate minerals.

Reference will now be made in detail to certain claims of the invention, examples of which are illustrated in the accompanying structures and formulas. While the invention will be described in conjunction with the enumerated claims, it will be understood that they are not intended to limit the invention to those claims. On the contrary, the invention is intended to cover all alternatives, modifications, and equivalents, which may be included within the scope of the invention as defined by the claims.

PREFERRED EMBODIMENTS OF THE INVENTION

A detailed description of one or more embodiments of the invention is provided below along with accompanying Figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Unless defined otherwise, all technical and scientific terms used herein generally have the same meaning as commonly understood by one of ordinary skill in the art to which this invention belongs. Generally, the nomenclature used herein and the laboratory procedures in chemistry, analytical chemistry, geochemistry and mineralogy are those well-known and commonly employed in the art.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

In this specification the terms "comprise, comprises, comprised and comprising" and the terms "include, includes, included and including" are deemed to be totally interchangeable and should be afforded the widest possible interpretation.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "respective" and like terms mean "taken individually". Thus, if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains.

The term "STP" refers to Standard Temperature and Pressure as defined by the International Union of Pure and Applied Chemistry (273.15K, 0.986 atm).

The term "ARD" refers to Acid Rock Drainage; a condition caused by reactions between atmospheric oxygen, water and minerals. This condition may produce acidic runoff. This runoff is primarily composed of sulfuric acid ($H_2SO_4$) where sulfate and sulfide-rich minerals are oxidized. With the scope of the present invention, the source of an ARD comprises a metal sulfide or sulfate-containing material. In another embodiment, the metal sulfide or sulfate-containing material is selected from the group consisting of ore, mine waste rock and metal sulfide tailings. In yet another embodiment, the metal sulfide or sulfate-containing material comprises one or more metal sulfides selected from, but not limited to the group consisting of pyrite, pyrrhotite, marcasite, arsenopyrite, argentite, chalcopyrite, cinnabar, galena, molybdenite, pentlandite, realgar, sphalerite, stibnite, and combinations thereof.

The term "sulfide" refers to a binary compound of sulfur with a metal.

As used herein, the term "metal sulfide" refers to compounds containing both metal cations and sulfide or disulfide anions. These include, but are not limited to pyrite (iron disulfide, $FeS_2$), pyrrhotite ($Fe_{1-x}S$), marcasite (white iron pyrite), arsenopyrite (FeAsS), argentite ($Ag_2S$), chalcopyrite ($CuFeS_2$), cinnabar (HgS), galena (PbS), molybdenite ($MoS_2$), pentlandite [$(Fe,Ni)_9S_8$], realgar (alpha-$As_4S_4$), sphalerite [(Zn,Fe)S], stibnite ($Sb_2S_3$). The metal sulfide may be present as an impurity, a high content component or a low content component in a multitude of ores, including coals. As used herein, the term "sulfide-rich" refers to a chemical matter/material containing elevated levels (preferably >2% by weight) of sulfide minerals, including but not limited to those noted above. To be clear, the term "sulfide rich" encompasses compositions which additionally comprise sulfate-based compounds, as described herein.

As used herein, sulfate (also spelled sulphate) refers to the sulfate ion, a conjugate base of sulphuric acid. The sulfate ion is a polyatomic anion with the empirical formula $SO_2^{-4}$. Ionic sulfates are prepared by oxidizing metal sulfides or sulfites. While much focus on ARD is on acidity and dissolved metals due to their toxicity and environmental liability, somewhat less attention is focused on dissolved sulfate in ARD despite high concentrations in some systems. The process of the present invention addresses both.

The term "heap" refers to a mound, pile or dump of crushed and/or agglomerated ore located on an impermeably lined leach pad. This heap had been at one time during the operation of the associated mine, or was piled with the intention of being, irrigated with a solution designed to leach metals of interest.

The term "in-situ", in respect to a process, refers to a process taking place within an existing pile, heap or other source of material, by injecting or otherwise adding reactants, without removal or relocation of the solid source material.

The term "metal products" refers to saleable forms of concentrated or purified metals including, but not limited to, lead (Pb), zinc (Zn), copper (Cu) and iron (Fe).

The term "$CO_2$" refers to carbon dioxide gas.

The term "$CO_2$-enriched gas mixture" refers to a mixture of gases which contains elevated levels (generally >1% by weight) of $CO_2$. In a preferred form, pure $CO_2$ is not used as a reactant within the process of the invention. In a most preferred form, the $CO_2$-enriched gas mixture is a mixture of gases (for example, comprising not only $CO_2$ but also $O_2$, $N_2$ and/or $SO_2$). Within the scope of the invention, a wide variety of sources of $CO_2$ gases or gas mixtures may be used. Preferably, the $CO_2$ gas or $CO_2$ enriched gas mixture derives from a commercial or industrial $CO_2$ emitting course, for example a power plant, a lime kiln, a cement plant, a hydrocarbon-fueled electrical power generation facility, a heating plant, a natural gas processing plant, a synthetic fuel plant or fossil fuel-based hydrogen production plant or any other fossil fuel or biomass energy facility which is $CO_2$-generating. Most preferably, the $CO_2$-enriched gas mixture used for conversion of the sulfide minerals is sourced and used directly from hydrocarbon burning operations. The $CO_2$-enriched gases may be sourced, on one preferred form, from a lime or cement plant, or other industrial processes.

The term "$H_2SO_4$" refers to sulfuric acid, in aqueous solution.

The term "$H_2S$" refers to hydrogen sulfide in gaseous form.

The term "$SO_2$" refers to sulfur dioxide in gaseous form.

The term "$SO_3$" refers to sulfur trioxide in gaseous form.

The term "sequestration" refers to the capture and long-term storage of carbon, primarily from $CO_2$, in a form which will not readily release it back into the atmosphere without some degree of outside intervention. This eliminates the greenhouse potential of the stored carbon, as it is removed from the atmosphere.

The term "ore" refers to a mineral or an aggregate of minerals from which a valuable constituent, especially a metal, can be profitably mined or extracted.

The term "dry tailings" refers to the remaining portion of an ore consisting of finely ground rock after some or all of the desired material, such as a metal, has been extracted, and water removed by filtration.

The term "mine" refers to a site where the extraction of minerals, metals, or other geological materials from the earth, usually from an ore body, vein, or (coal) seam takes place. Materials recovered by mining include base metals, precious metals, iron, uranium, coal, diamonds, limestone, oil sands, oil shale, rock salt, and potash.

The term "mineral" refers to an element or chemical compound that is normally crystalline and that has been formed as a result of geological processes. It has a characteristic chemical composition, a highly ordered atomic structure, and specific physical properties. Minerals range in composition from pure elements and simple salts to very complex silicates with thousands of known forms. A rock is an aggregate of one or more minerals.

The term "mine waste" refers to any waste material, including but not limited to surface overburden, non-ore rock, lean ore, tailings, or hydrometallurgical residue generated during the process of excavation and beneficiation of ore that is stored, discarded, or disposed of. Mine waste is a known source of pollution due to its potential to generate ARD and to leach metals into the environment, polluting soils, surface water, and groundwater.

The term "slurry" refers to a thick suspension of solids in a liquid. Solid materials are often transported in a pipeline as a slurry.

The term "carbonate mineral" refers to minerals containing the carbonate ($CO_3^{2-}$) anion. Non-limiting examples are lead carbonate ($PbCO_3$, cerussite), zinc carbonate ($ZnCO_3$, smithsonite), magnesium carbonate ($MgCO_3$, magnesite), and iron carbonate ($FeCO_3$, siderite).

The term "solids" refers to the state of matter characterized by a distinct structural rigidity and resistance to deformation (that is changes of shape and/or volume). The particles in a solid (ions, atoms or molecules) are packed closely together. The forces between particles are strong enough so that the particles cannot move freely but can only vibrate. As a result, a solid has a stable, definite shape, and a definite volume.

The term "tailings" in mining refers to gangue or fine grained mineral remains of ore, once most of the valuable metals and minerals have been removed in the ore milling process. Tailings often contain residual valuable metals or minerals but at amounts that are uneconomical to recover through available milling processes. Tailings are a known source of pollution due to their potential to generate ARD and to leach metals into the environment.

The term "wet tailings" refers to the remaining portion of an ore comprising of finely ground rock and process liquid after some or all of the desired material, such as a metal, has been extracted. Wet tailings are a waste product of mining.

As used herein, "separating" refers to the process of removing solids, liquid and/or a gas from at least one of the other. The process can employ any technique known to those of skill in the art, e.g., decanting the mixture, filtering the solids from the mixture, or a combination thereof.

Any given numerical range shall include whole and fractions of numbers within the range. For example, the range "1 to 10" shall be interpreted to specifically include whole numbers between 1 and 10 (e.g., 1, 2, 3, 4, 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

The Problems:

As noted above, ARD is a process whereby sulfuric acid is produced when sulfide minerals in rocks are exposed to air and water. For example, when large quantities of rock containing sulfide minerals are excavated from an open pit or exposed in an underground mine, they react with water and oxygen to create sulfuric acid. The acid will leach from the rock as long as it is exposed to air and water, until the sulfide minerals are fully reacted—a process that can last hundreds, even thousands of years. Acid is carried off the mine site by rainwater or surface drainage and deposited into nearby streams, rivers, lakes and groundwater. ARD severely degrades water quality, and can kill aquatic life and make water virtually unusable.

Figure 4:
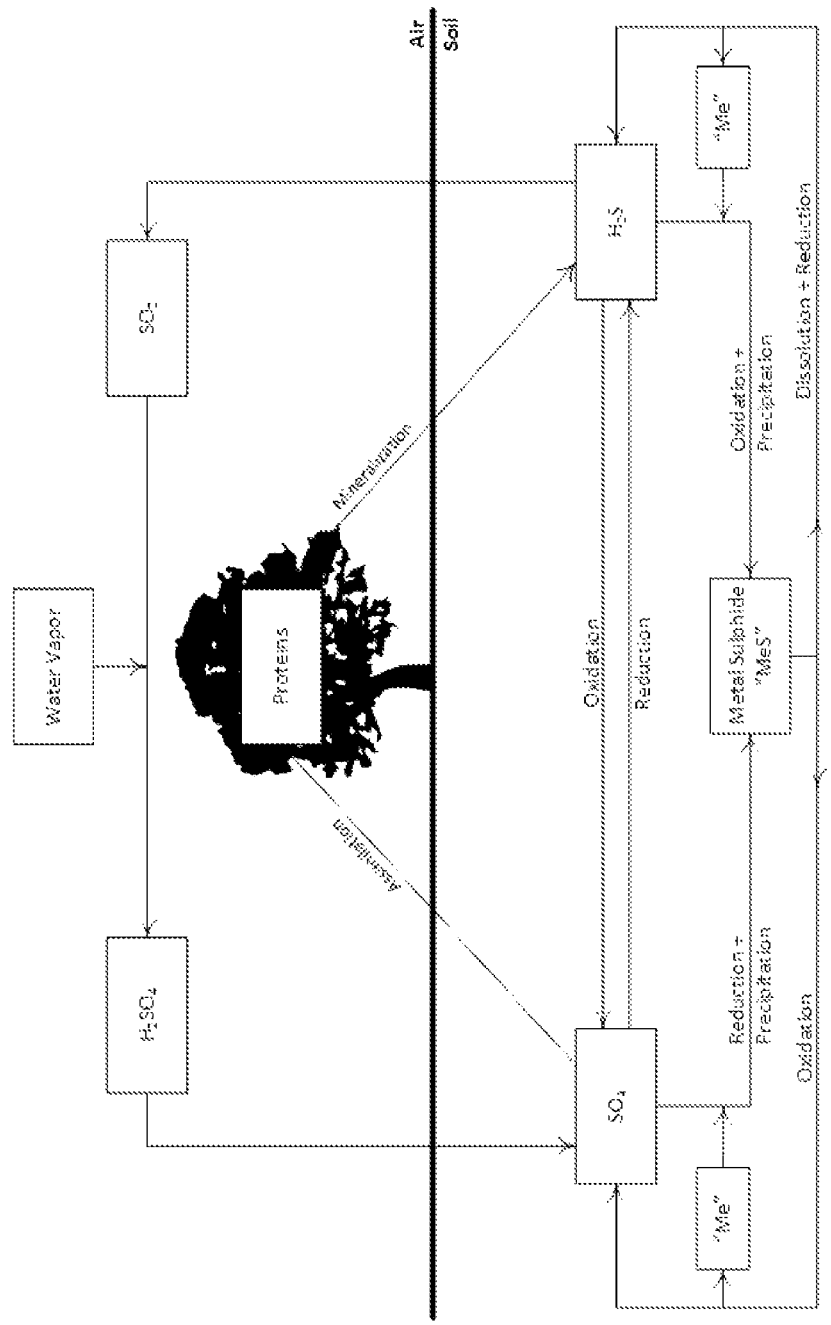
FIG. 4 illustrates a block flow diagram depicting the biogeochemical cycle of sulfur.

FIG. 4 shows the geochemical cycle of sulfur. Most of the sulfur in the earth's sediments and crust is present in the form of primary elemental sulfur and sulfide minerals, which may be oxidized into sulfate through both biotic and abiotic processes. This is the process responsible for ARD.

Sulfate in soils can be taken up by plants and assimilated into proteins. When plants die and decay, microorganisms mineralize the sulfur in the proteins into hydrogen sulfide or sulfate. The hydrogen sulfide can then be combined with metals to form metal sulfides, or the hydrogen sulfide can be oxidized to elemental sulfur or sulfur dioxide, depending on redox conditions and involvement of biota. In cases where hydrogen sulfide combines with metals, authigenic or secondary sulfide minerals are formed. In the atmosphere, sulfur dioxide may be oxidized and combine with water to form sulfuric acid, which may report to the terrestrial and aqueous environment as acid rain. Direct transformation between sulfate and hydrogen sulfide can be accomplished through a variety of processes.

Human activities have had a major effect on the natural aspects of the aforementioned sulfur cycle and the formation of ARD. Without human impact, primary elemental sulfur and sulfide minerals would stay tied up in rocks for millions of years until they were uplifted through tectonic events and then released through erosion and natural weathering processes.

Like ARD, carbon sequestration is a topic receiving enormous attention in the media and among government agencies and industries involved in fossil fuel production and use. Combustion of fossil fuels is responsible for approximately 83% of greenhouse gas emissions in the U.S. Currently, the U.S. emits $6.0 \times 10^9$ tons carbon dioxide per year and this value is expected to increase by 27% over the next 20 years. Furthermore, the reported link between increasing concentrations of greenhouse gases such as carbon dioxide ($CO_2$) in the atmosphere and global climate change has prompted several countries to adopt environmental standards that cap $CO_2$ emissions and aim to reduce current emissions. Although the U.S. has not adopted a similar set of standards, in April 2007, the U.S. Supreme Court ruled that carbon dioxide was a pollutant and that the U.S. Environmental Protection Agency (U.S. EPA) has the authority and obligation to regulate carbon dioxide emissions from automobiles. More recently, the U.S. EPA has decided that carbon dioxide poses a threat to human health and the environment and that it will now be added to a list of 5 other greenhouse gases that can be regulated under the Clean Air Act. Given recent activity regarding carbon dioxide emission regulations, it is projected that the federal government may enact a carbon cap-and-trade bill. When this eventually occurs, utility companies and coal producers are in a position to be particularly affected by federal carbon dioxide regulation due to the large carbon dioxide footprint of coal-fired power plants. Although no carbon dioxide standards have been applied to power plant emissions in the U.S., plans for dozens of new coal-fired power plants have either been scrapped or delayed due to issues revolving around states concerned with future climate change legislation. Whether there is global consensus on the causes of climate change or not, it appears that carbon dioxide-emitting industries in the U.S. will soon be required to implement carbon management protocols that reduce emissions and (or) purchase or produce carbon credits.

Within the scope of the process of the present invention, one key aspect is the reduction of ARD and the reduction of metal leaching of sulfide-rich waste streams. Another key benefit to this process is the sequestration of $CO_2$ in carbonate minerals. These benefits occur through reactions such as, but not limited to, the following:

$$FeS_2 + CO_2 + 2H_2O \rightarrow FeCO_3 + 2H_2S + 0.5O_2$$

$$FeS_2 + CO_2 + 2H_2O + 3.5O_2 \rightarrow FeCO_3 + 2H_2SO_4$$

$$FeS + CO_2 + H_2O \rightarrow FeCO_3 + H_2S$$

$$FeS + CO_2 + H_2O + 2O_2 \rightarrow FeCO_3 + H_2SO_4$$

$$ZnS + CO_2 + H_2O \rightarrow ZnCO_3 + H_2S$$

$$ZnS + CO_2 + H_2O + 2O_2 \rightarrow ZnCO_3 + H_2SO_4$$

So, the invention provides a process to treat sulfate and/or sulfide-rich mine and industrial waste using $CO_2$-enriched gas mixtures to produce carbonate minerals, thereby sequestering $CO_2$, and reducing or eliminating the waste's ARD and/or metal leaching properties. Key processes include: (a) contacting sulfide-rich waste with a $CO_2$-enriched gas mixture, to produce reacted waste that is more stable in an ambient atmospheric environment; (b) recovering potentially valuable metal by-products from the reacted slurry; and (c) separating and recovering sulfuric acid or elemental sulfur from the reacted gas and fluids.

It is an object of the present invention to process sulfate and/or sulfide-rich mine waste using $CO_2$-enriched gas mixtures to produce carbonate minerals, thereby achieving the dual benefit of (1) reducing or eliminating ARD; and (2) sequestering $CO_2$.

It is another object of the present invention to separate sulfur compounds into value-added, saleable products (for example, sulfuric acid and elemental sulfur, etc.)

It is an object of the present invention to process sulfate and/or sulfide-rich mine waste, wherein said waste comprises one or more existing heaps, waste rock piles, tailings dams or stacks, and reprocessed slurries.

It is an object of the present invention, in one preferred aspect, to receive and process off-gasses from a hydrocarbon power plant, lime kiln, cement plant or other $CO_2$-emitting source. It is an additionally preferred aspect of the present invention that the process does not require further artificially elevated temperature or pressure to operate and to achieve the reaction goals.

It is an object of the present invention to expose a sulfate and/or sulfide-rich mine or industrial waste to a $CO_2$-enriched gas mixture to produce a reacted waste that is stable at ambient, atmospheric environment(s).

It is an object of the present invention, in one preferred aspect, to receive and process off-gasses from a hydrocarbon power plant, lime kiln, cement plant or other $CO_2$-emitting source wherein such gases are $CO_2$-enriched gases, and not pure $CO_2$. In this embodiment, it is preferred that there is used, within the process of the invention, a mixture of gases (potentially containing $O_2$, $N_2$ and/or $SO_2$) than with pure $CO_2$.

In one aspect of the present invention, the mine waste is selected from the group consisting of dry mine waste, dry tailings, wet tailings and heaps. More specifically, the mine waste to be treated can be either coarse or fine rock.

The present invention provides a process for stabilizing a sulfate and/or sulfide-rich waste material (comprising metal sulfide minerals and/or metal sulfates) which comprises exposing the material to a $CO_2$-enriched gas mixture, reacting the $CO_2$-enriched gas mixture with the metal sulfide minerals and forming a $CO_2$-depleted gas mixture and a carbonate-containing compound and at least one product selected from the group consisting of a purified metal or a metal-rich compound suitable for smelting or refining, sulfuric acid, sulfur, and sulfurous acid.

In one aspect, within the reaction zone or reaction vessel, when the waste, gas mixture, water and other reactants are combined, there are conditions of Standard Temperature and Pressure (STP). In other words, in this aspect, it is not required to make external modifications to temperature or pressure conditions in order for the dual processes of the present invention to occur. That said, during the reaction, temperature and pressure may increase as a consequence of the chemical reactions. Furthermore, temperature or pressure conditions in the reaction zone or reaction vessel may become inherently elevated as a consequence of the addition of a $CO_2$-enriched gas mixture from a source, for example, a hydrocarbon burning operation.

In another aspect, temperature and/or pressure in the reaction zone or reaction vessel may be elevated. Such ranges of temperature and pressure may vary. These conditions may be manipulated by operators of the system or may be as a consequence of high-temperature feed gases entering the reaction zone directly from a power plant, lime kiln, cement plant or other $CO_2$ source, as described herein.

In this way, temperature in the reaction zone may increase to a temperature of:
  up to about 500° C.
  up to about 400° C.
  up to about 300° C.
  up to about 200° C.
  up to about 150° C.

In this way, pressure in the reaction zone or reaction vessel may locally be elevated:
  up to about 10 atmospheres
  up to about 7 atmospheres
  up to about 5 atmospheres Such pressure and/or temperature elevation occurs for a suitable length of time, in accordance with the reactions described and claimed herein, to facilitate reactant flow and mixing. Exemplary lengths of time range from one minute to 24 hours.

It is preferred that the means to separate solid and liquid reacted products are filters.

In one aspect, the apparatus of the invention may further include one or more of the following: (a) a reactor which separates Sulfuric Acid ($H_2SO_4$) from reacted liquid products; (b) a reactor which produces elemental sulfur from reacted liquid products; (c) a purifier which produces either concentrated metal in solution or solid metal products; (d) a crushing and grinding circuit which can produce fine-grained material from a feed stream of varying size; (e) a scrubber which removes Hydrogen Sulfide ($H_2S$), Sulfur Dioxide ($SO_2$) or Sulfur Trioxide ($SO_3$) gas from reacted gas products.

In yet a further aspect of the invention, there is provided a system adapted to contain an in situ process, for example, wherein the reaction zone is a contained in situ waste site. In this case, the system comprises: (a) a source of sulfate and/or sulfide-rich mine or industrial waste located in a heap or pile on a non-permeable liner; (b) a series of pipes or lined trenches for draining reacted liquid off the non-permeable liner; (c) a vessel for storing reacted liquid; (d) a cap or cover to trap injected gas; (e) a source of a $CO_2$-enriched gas mixture; (f) water and other reactants; (g) a pipe system beneath the cover to distribute water and reactants on the heap; (h) a pipe system to inject the $CO_2$-enriched gas mixture into the waste material wherein it will combine with the waste materials, water and other reactants at STP or at an elevated temperature up to about 250° C. (more probably up to 100° C.) and/or elevated pressure up to about 5 atmospheres (more probably up to 2 atmospheres).

The system, when used for an in situ process, may further include one or more of the following: (a) a heat exchanger to control the temperature of the water and other reactants; (b) a heat exchanger to lower or elevate the temperature of the $CO_2$-enriched gas mixture; (c) a reactor which separates $H_2SO_4$ from the drained reacted liquid; (d) a reactor which produces elemental sulfur from the drained reacted liquid; (e) a purifier which produces either concentrated metal in solution or solid metal products; (f) a pressure release system which allows collection of reacted gas products; (g) a scrubber which removes $H_2S$, $SO_2$ or $SO_3$ gas from reacted gas products.

In operation, and with reference to FIGS. 1-3, the process is preferably as follows:

FIG. 1 illustrates a block flow diagram depicting the reaction of a $CO_2$-enriched gas mixture with mine and industrial waste products which are in slurry form, with the recovery of $H_2SO_4$, $H_2S$, $SO_2$, $SO_3$, elemental sulfur and metal products, and the sequestration of $CO_2$ in carbonate minerals from waste slurry 12. While any suitable and appropriate substance can be employed to form the slurry 12 from waste, water is a particularly suitable substance. In specific embodiments, a waste stream will include the requisite amount of water such that it is effectively a slurry.

Slurry 12, along with a stream of water/reagents 14 and $CO_2$-enriched gas mixture 16 is fed into reactor 18. From reactor 18, reacted gas 20 is directed to scrubber 22 and an acid/metal solution 24 is fed to a reactor/separator 26.

Scrubber 22 is preferably a $H_2S$, $SO_2$ or $SO_3$ scrubber by which $CO_2$-depleted gas 28 is released to the atmosphere and sulfuric acid/sulfur 29 is recovered. Preferably scrubbed gas 23 is released from scrubber 22, and fed to vent 19. $CO_2$-depleted gas 28 is released to the atmosphere from vent 19. Reagents 30 are fed to reactor/separator 26 yielding from the reaction therein sulfuric acid/sulfur 29 and metal solution 32 which is fed to purifier 34. The products of purifier 34 comprise water 35 and purified metal 36.

Figure 2:
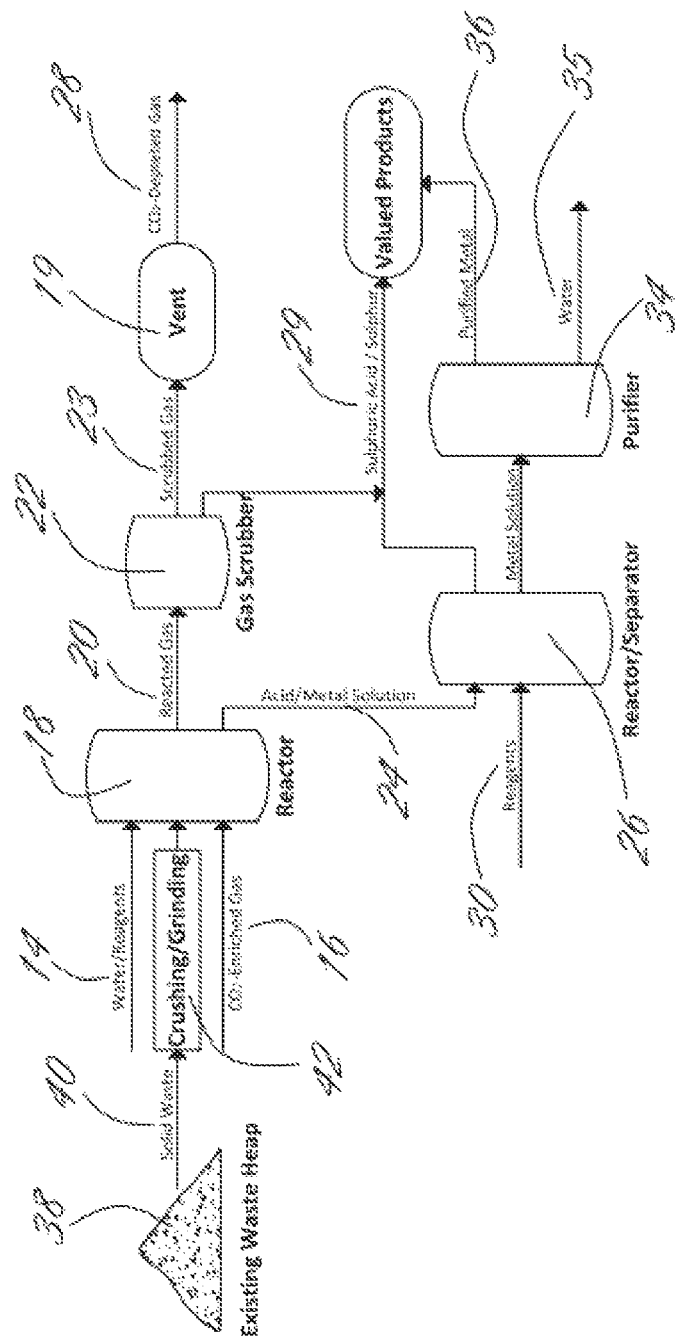
FIG. 2 illustrates a block flow diagram depicting the reaction of a $CO_2$-enriched gas mixture with mine and industrial waste products which require further grinding and/or crushing, with the recovery of $H_2SO_4$, $H_2S$, $SO_2$, $SO_3$, elemental sulfur, and metal products, and the sequestration of $CO_2$ in carbonate minerals.

FIG. 2 illustrates a block flow diagram depicting the reaction of a $CO_2$-enriched gas mixture with mine and industrial waste products which requires further grinding and/or crushing, with the recovery of $H_2SO_4$, $H_2S$, $SO_2$, $SO_3$, elemental sulfur, and metal products, and the sequestration of $CO_2$ in carbonate minerals. The process is the same as the process of FIG. 1 with the exception of pre-processing of existing waste heap 38. In this manner, solid waste 40 from heap 38 is ground and/or crushed at 42 forming ground/crushed waste. Ground/crushed waste is fed to reactor 18 in a process as noted above.

Figure 3:
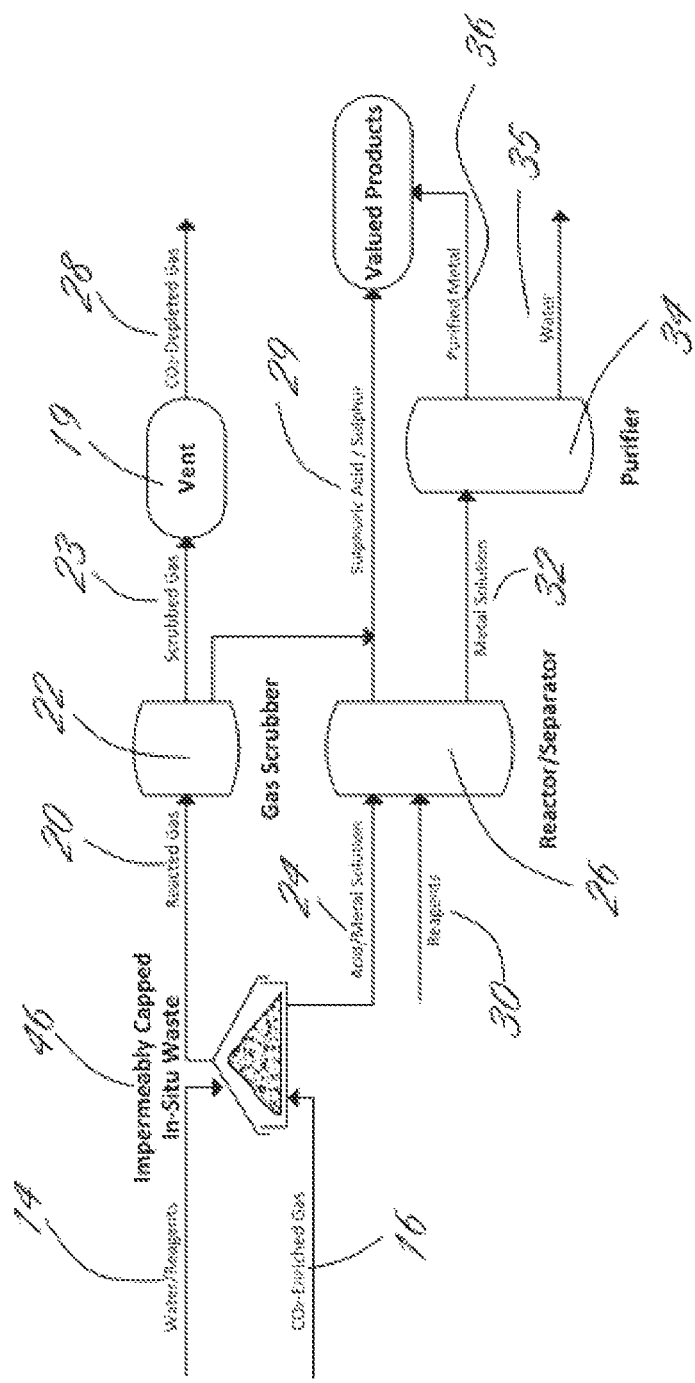
FIG. 3 illustrates a block flow diagram depicting an in-situ reaction of a $CO_2$-enriched gas mixture with coarse material from an existing mine or industrial waste heap, with the recovery of $H_2SO_4$, $H_2S$, $SO_2$, $SO_3$, elemental sulfur, and metal products, and the sequestration of $CO_2$ in carbonate minerals.

FIG. 3 illustrates a block flow diagram depicting an in situ reaction of a $CO_2$-enriched gas mixture with coarse material from an existing mine or industrial waste heap, with the recovery of $H_2SO_4$, $H_2S$, $SO_2$, $SO_3$, elemental sulfur, and metal products, and the sequestration of $CO_2$ in carbonate minerals. In this aspect, impermeably or substantially impermeably capped waste 46 is the reaction zone into which water/reagents 14 and $CO_2$-enriched gas mixture 16 is fed. The process thereafter is the same as FIG. 1.

Within one aspect of the present invention, a reactor or reaction zone may comprise two or more counter-current cells. In this aspect, the slurry, reagents and/or water flow into a first cell in sequence, then proceed onwards through a series of latter cells. The $CO_2$-enriched reaction gasses will proceed counter-current, first entering the last cell in sequence and progressing in reverse, towards the first cell. This configuration and system may promote more complete sulfide neutralization reactions with certain combinations of $CO_2$-enriched gas and sulfide minerals as the highest concentration of $CO_2$-enriched gas will encounter the lowest concentrations of sulfide minerals first, thus driving the reactions further to completion.

Figure 5:
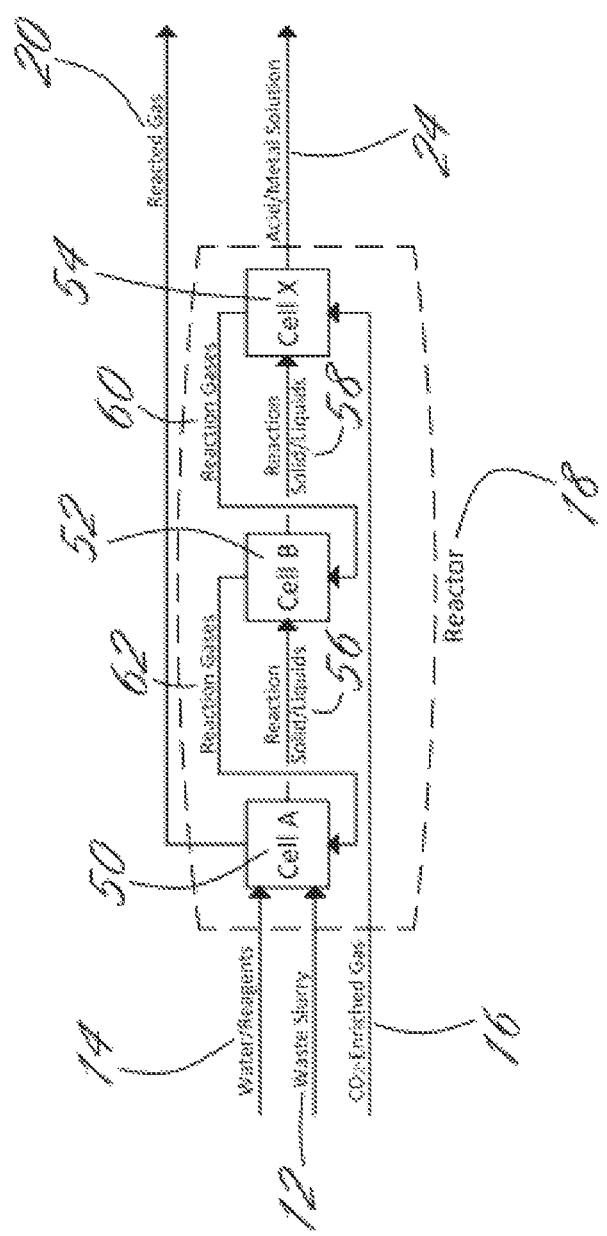
FIG. 5 illustrates a block flow diagram of a counter-current reactor in accordance with one aspect of the present invention.

FIG. 5 illustrates a block flow diagram depicting a reactor 18 comprising multiple counter-current reaction cells (50, 52 and 54, also noted as Cell A, Cell B and Cell X, respectively). While this figure shows three cells it is meant to represent any number from two or higher connected in a similar fashion (hence 54 or Cell X is be the "last cell" of any number of cells). Waste slurry 12, water and/or reagents 14 enter the first cell 50 and feed onwards through subsequent cells (50(A)→52(B)→ . . . →54(X). Reaction solids/reaction liquid products shown Cell A(50) to Cell B(52) as 56 and reaction solids/reaction liquid products shown Cell B(52) to Cell X(54) as 58.

$CO_2$-enriched gas 16 enters the last cell (54 or X) and proceeds in reverse direction (right to left) to the first cell ((54)X→ . . . →(52)B→(50)A). Acid/metal solution 24 exits from the last cell and reacted gas 20 exits from the first cell. Reaction gases shown Cell X(54) to Cell B(52) as 60 and reaction gases shown Cell B(52) to Cell A(50) as 62.

Generally, an effective amount of $CO_2$ enriched gas mixture in accordance with the present invention to be used with the metal sulfide-containing mine or industrial waste is an amount (and in a flow) sufficient to interact with most or all reactive sites of the metal sulfide compounds in the metal sulfide-containing material. As such, the amount of the of $CO_2$ enriched gas mixture to be reacted with the metal sulfide-containing material or the area in need of treatment will vary widely, and may be determined to the person skilled in the art, based on the surface area to be treated, the volume of material to be treated, the pH of the material to be treated, concentration and species of sulfate and/or sulfide present and the overall moisture level in the material to be treated. Generally, the amount of $CO_2$ enriched gas mixture used will be in excess of that theoretically required to ensure complete reaction of sulfates and/or sulfides.

As alluded to above, the amount of contact time between the $CO_2$ enriched gas mixture and the metal sulfate and/or sulfide-containing material to ensure proper reaction with the metal sulfate and/or sulfide-containing material, as required by the present invention, may vary depending on the environmental factors present at the time. The contact time may be less than 5 minutes, between 5 and 15 minutes, between 15 and 30 minutes, between 30 minutes and 1 hour, between 1 hour and 5 hours, between 5 hours and 1 day, between 1 day and 3 days, between 3 days and 7 days, between 7 days and 14 days, between 14 days and 1 month, between 1 month and 3 months, between 3 months and 1 year, or any fraction or multiple thereof. The required amount of reaction time may be estimated by those skilled in the art, based on sampling of the metal sulfate and/or sulfide-containing material and determination of extent of reactivity between the $CO_2$ enriched gas mixture and the metal sulfate and/or sulfide-containing material using the methods known in the art and/or disclosed in the present application.

In one aspect, the present invention provides a process for stabilizing a sulfate and/or sulfide-rich waste material (comprising metal sulfide minerals) and sequestering $CO_2$ which comprises exposing the waste material to a $CO_2$-enriched gas mixture, reacting the $CO_2$-enriched gas mixture with the metal sulfide minerals and forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

Preferably, $CO_2$-enriched gas mixture is sourced from at least one of a commercial and industrial $CO_2$ emitting source. Preferably, $CO_2$-enriched gas mixture comprises >1% by weight of $CO_2$. Preferably, $CO_2$-enriched gas mixture comprises $CO_2$ and at least one of $O_2$, $N_2$ and/or $SO_2$. Preferably, $CO_2$-enriched gas mixture is sourced from one of a fossil fuel-based hydrogen production plant and a biomass energy facility which is $CO_2$-generating. Preferably, $CO_2$-enriched gas mixture is sourced from at least one of a power plant, a lime kiln, a cement plant, a hydrocarbon-fueled electrical power generation facility, a heating plant, a natural gas processing plant, and a synthetic fuel plant, which is $CO_2$-generating.

In one aspect, the waste material is selected from the group consisting of surface overburden, non-ore rock, lean ore, tailings, and hydrometallurgical residue generated during a process of excavation and beneficiation of ore that is at least one of: stored, discarded, and disposed of. Preferably, the waste material is at least one of dry and wet mine tailings.

Preferably, the metal sulfide minerals comprise at least one of the following: pyrite (iron disulfide, $FeS_2$), pyrrhotite ($Fe_{1-x}S$), marcasite (white iron pyrite), arsenopyrite (FeAsS), argentite ($Ag_2S$), chalcopyrite ($CuFeS_2$), cinnabar (HgS), galena (PbS), molybdenite ($MoS_2$), pentlandite [$(Fe,Ni)_9S_8$], realgar (alpha-$As_4S_4$), sphalerite [$(Zn,Fe)S$], and stibnite ($Sb_2S_3$). Preferably, purified metal is a metal rich compound comprising at least one concentrated and/or purified metals selected from the group consisting of lead (Pb), zinc (Zn), copper (Cu) and iron (Fe).

In one aspect, the waste material in a reactor/reaction zone is at substantially standard temperature and pressure (STP) when initially exposed to $CO_2$-enriched gas mixture in a reaction zone. In another aspect, in a reaction between the waste material and $CO_2$-enriched gas mixture in a reactor or reaction zone, a temperature is selected from one of the following:
  a) up to about 500° C.
  b) up to about 400° C.
  c) up to about 300° C.
  d) up to about 200° C.
  e) up to about 150° C.

and a pressure is selected from one of the following:
a) up to about 10 atmospheres
b) up to about 7 atmospheres
c) up to about 5 atmospheres.

In one aspect, a reaction between the waste material and $CO_2$-enriched gas mixture occurs in one of i) a reactor or ii) a reaction zone and the reaction zone is selected from: i) an in situ waste site and ii) two or more counter-current cells.

In another aspect, there is provided herein a process for stabilizing a sulfate and/or sulfide-rich waste material (comprising metal sulfide minerals) and sequestering $CO_2$ which comprises: (a) contacting a sulfide-rich waste with a $CO_2$-enriched gas mixture in a reaction zone to produce reaction mixture; (b) recovering from the reaction mixture metal by-products; and (c) separating and recovering one or more of sulfuric acid, sulfur, hydrogen sulfide, sulfur dioxide, sulfur trioxide and sulfurous acid from the reaction mixture.

In another aspect, there is provided herein an apparatus for processing sulfate and/or sulfide-rich mine and industrial waste that comprises:
(a) a reactor/reaction zone comprising mine or industrial waste wherein the waste comprises at least one of crushed or ground waste rock, dry tailings, wet tailings, ore stockpiles, or other sulfide-rich materials;
(b) feed line into the reactor/reaction zone, for delivery of a $CO_2$-enriched gas mixture;
(c) feed line for water and other reactants; and
(d) means to separate solid and liquid reacted products.

Preferably, the apparatus comprises at least one of the following: (a) a heat exchanger to control a temperature of water and other reactants; (b) a heat exchanger to lower or elevate a temperature of the $CO_2$-enriched gas mixture; (c) a reactor which separates $H_2SO_4$ from the liquid reacted products; (d) a reactor which produces elemental sulfur from the liquid reacted products; (e) a purifier which produces either concentrated metal in solution or solid metal products; (f) a pressure release system which allows collection of any reacted gas products; (g) a scrubber which removes $H_2S$, $SO_2$ or $SO_3$ gas from said reacted gas products.

Preferably, the apparatus comprises at least one of the following: (a) a reactor which separates Sulfuric Acid ($H_2SO_4$) from liquid reacted products; (b) a reactor which produces elemental sulfur from liquid reacted products; (c) a purifier which produces either concentrated metal in solution or solid metal products; (d) a crushing and grinding circuit which can produce fine-grained material from a feed stream of varying size; (e) a scrubber which removes Hydrogen Sulfide ($H_2S$), Sulfur Dioxide ($SO_2$) or Sulfur Trioxide ($SO_3$) gas from any reacted gas products.

In another aspect, there is provided herein a system for stabilizing a sulfate and/or sulfide-rich waste material (comprising metal sulfide minerals) and sequestering $CO_2$ and adapted to contain an in situ process, wherein a reaction zone is a contained in situ waste site, said system comprising: (a) a source of sulfide-rich mine or industrial waste located in one of i) a heap and ii) pile on a non-permeable liner; (b) a series of pipes/lined trenches for draining a reacted liquid product off the non-permeable liner; (c) a vessel for storing reacted liquid product; (d) a cap/cover to trap injected gas; (e) a source of a $CO_2$-enriched gas mixture; (f) water and other reactants; (g) a pipe system beneath the cap/cover to distribute water and reactants on the heap/pile; and (h) a pipe system to inject the $CO_2$-enriched gas mixture into the waste material wherein $CO_2$-enriched gas mixture may combine with the waste material, water and other reactants.

Preferably, in the system, wherein heap/pile is reaction zone reactions occur at one of i) STP and ii) an elevated temperature up to about 250° C. and/or elevated pressure up to about 5 atmospheres.

In another aspect, there is provided herein a process for stabilizing a sulfate and/or sulfide-rich waste material (comprising metal sulfide minerals) and sequestering $CO_2$ which comprises exposing the waste material to a $CO_2$-enriched gas mixture in a reactor/reaction zone, wherein reactor/reaction zone comprises at least two counter-current cells and wherein waste material, reagents and/or water flow into a first cell in sequence, then proceed onwards (in a first direction) through a series of latter cells to a last cell and wherein $CO_2$-enriched gas mixture flow in a second, opposite direction, in counter-current to first direction, such that $CO_2$-enriched gas mixture enters the last cell and proceeds to the first cell, said process forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

Further, in the processes taught herein, the various acts may be performed in a different order than that illustrated and described. Additionally, the processes can omit some acts, and/or employ additional acts. As will be apparent to those skilled in the art, the various embodiments described above can be combined to provide further embodiments. Aspects of the present systems, processes and components can be modified, if necessary, to employ systems, processes, components and concepts to provide yet further embodiments of the invention. For example, the various processes described above may omit some acts, include other acts, and/or execute acts in a different order than set out in the illustrated embodiments.

These and other changes can be made to the present systems, processes and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form.

EXAMPLES

Feasibility of Reacting $CO_2$-Rich Flue Gas with Sulfide Mine Tailings to Form Stable Carbonates These following experiments involved exposing samples of material with elevated levels of sulfide minerals to $CO_2$ gas under various conditions, for varying periods of time, and then using different characterization methods to determine if carbonates have formed.

The material used in most of these experiments is the reference material CPB-2 available from Natural Resources Canada. CPB-2 is a lead flotation concentrate from the former Sullivan Mine concentrator at Kimberley, British Columbia, Canada. The material is a very fine, black powder. The mineral species contained include galena PbS (64.7%), anglesite $Pb(SO_4)$ (12.1%), sphalerite ZnS (10.1%), pyrrhotite Fe1-xS (6.8%), pyrite $FeS_2$ (4.9%), plus various silicates and other phases at <0.6%. Elemental composition is approximately 63.5% Pb, 18% S, 6.0% Zn, 7.1% Fe, with other elements contributing the remainder. Powder X-ray diffraction measurements of untreated material confirms galena, anglesite and sphalerite as the dominant phases, with minor peaks from pyrrhotite and pyrite being more difficult to distinguish. No carbonate phases are detectable in the untreated material.

The test material (and any other components) was placed in a sealed vessel with a gas in-flow, attached to a cylinder of $CO_2$, and out-flow. The gas cylinder was then opened to allow $CO_2$ to enter the vessel and displace air through the out-flow; after 20-60 seconds the gas cylinder was closed and the in-flow and out-flow clamped shut. The sealed vessel containing $CO_2$ and the tailings powder was then left to react for varying periods of time at temperatures between room temperature (24° C.) and 300° C. The vessel was heated by a standard uncalibrated laboratory hot plate, and the temperature monitored by a temperature sensor with a thermocouple wire. The temperature in experiments using the hot plates varies within a range of 10° C.

In experiments 1-10, the vessel used was an Erlenmeyer flask sealed with a two-holed rubber stopper with glass tubing for the gas in- and out-flow. The stopper however did not provide an adequate seal and $CO_2$ was lost over periods greater than 24 hours. Later experiments used a custom-built vessel consisting of a flanged lid and body. The flanges are made with ground glass and when coated with a layer of grease (petroleum jelly was used) and clamped tightly, this provides an adequate seal to prevent $CO_2$ loss over the course of an experiment.

Two methods were used to characterize the experimental products: powder X-ray diffraction (PXRD), and the scanning electron microscope (SEM) equipped with an energy-dispersive X-ray spectrometer (EDS). PXRD allows identification of individual crystalline phases present in the material. However, phases making up less than around 10% of the total can be difficult to distinguish, and identifications of minor lines in a PXRD pattern can be less reliable than those of major lines. Non-crystalline phases such as ferrihydrite and other early stages which may precipitate from a solution cannot be detected as they lack a well-defined crystal structure.

Samples were examined with the SEM to inspect particles at the microscopic scale for signs of alteration and to identify local changes in chemistry. EDS allows identification of the chemical elements present in small areas (on the order of 10-100 μm in diameter) of the sample. SEM with EDS potentially allows identification of phases too amorphous or present in too small quantities to be identified, such as those which may form as rims on existing particles. A significant drawback of the EDS is that the equipment is much less sensitive to elements lighter than sodium, including carbon, which limits its ability to distinguish carbonates from oxides or sulfides containing the same heavier element. In addition, most methods of affixing the sample powder to a mount for insertion in the SEM are carbon-based, which leads to a potential carbon peak from the background. Due to these two factors, a particular spot being analyzed must therefore produce a strong carbon peak in order to be unambiguously identified as containing carbonate.

The first series of experiments conducted cover those conditions which are easiest to vary: temperature, presence or absence of water (i.e., dry powder vs. a solution), solution pH, $CO_2$ vs. air, and agitation of the solution. The second series of experiments are ongoing, and will include testing variations such as introducing $SO_2$ gas or other substances as potential catalysts and passing an electric current through a mixture of the tailings powder and water.

Experiments 1 and 2 consisted of 50 mL deionized (DI) water plus 20 g and 10 g of sample powder, respectively, under $CO_2$ at room temperature with constant stirring of the mixture. There was no visual difference in the mixtures after 5 days. The mixtures were then heated in air overnight at around 90° C. to remove the water. After heating overnight experiment 2 still had some liquid left with no other apparent change, while experiment 1 was completely dry with red and grey-white solids formed on the top of the black sample powder (the latter formed around the stir rod which was left in the flask). There was also a sharp odour and discolouration on the sides of the flask consistent with $SO_3$ formation. The red solid appeared to be poorly-crystalline iron oxyhydroxide while the grey-white solid appeared to be a mix of iron oxyhydroxide and a platey calcium-rich phase. The source of the calcium is uncertain, as the reported Ca content of the tailings powder is only 0.07%. PXRD of both experiments showed very little change from the unaltered powder. PXRD of experiment 1 shows a small line at low angles matching the calcium-bearing zeolite chabazite, which may be the calcium-rich phase.

These experiments show that the sulfides in the sample powder, particularly the iron sulfides, can be converted to oxides or oxyhydroxides with exposure to heat, air and water, i.e., S is replaced with 0 or OH. This suggests that in a higher $CO_2$ atmosphere, reactions may occur which replace S with $CO_3$ instead.

Experiments 3 and 4 involved heating 10 g of sample powder dry at around 150° C. for 48 hours under $CO_2$ and air, respectively. In both experiments, an opaque white substance formed on the sides of the flask within about 15 minutes. Both SEM/EDS and PXRD confirmed this substance was elemental sulfur. Elemental sulfur is not reported in the certified analysis of the sample powder, nor was it detected in the unaltered powder by PXRD or SEM, so it may be liberated from one of the sulfide phases. After the experiment, the bulk powder was visually unaltered and showed no change in PXRD or SEM/EDS.

Experiments 5 through 11 were analyzed using SEM/EDS only, as those visible changes in experiments 1 to 4 did not contribute phases detectable by PXRD. We concluded that any changes likely to be induced would probably be surface alterations of grains that could be better detected with the SEM. This did not prove to be the case.

Experiment 5 involved heating 10 g of sample powder with 2 mL DI water at around 150° C. for 48 hours under air (with no stirring). As in experiments 3 and 4, a white film of elemental sulfur quickly formed on the sides of the vessel; in this case evaporation and condensation tended to wash the sulfur back down into the sample powder. After 48 hours the powder was agglomerated and visible red iron oxide formed on some spots of the surface. SEM/EDS analyses of experiment 5 were very similar to those of experiments 3 and 4 over most of the surface. Analyses near the red patches on the surface confirmed the presence of iron oxide. Again no signs of carbonate formation were seen. Samples from near both the edge and the centre of the flask were examined, as the surface consistency appeared slightly different in texture and colour, but EDS analyses showed no significant chemical difference.

Experiments 6A and 6B consisted of 26 mm×46 mm glass slides coated with a thin layer of sample powder heated under $CO_2$ at around 150° C. for 24 hours and one week, respectively. The goal in these experiments was to present a higher ratio of potentially reactive surface area to mass of material for easier characterization. Experiment 8 was similar, but heated at around 300° C. for two weeks. None of the three slides showed any visual change and SEM/EDS analyses did not detect any signs of carbonate formation.

Experiment 7 consisted of a whole piece of pyrite with one freshly cut, polished (hence presumably oxide-free) surface, heated under $CO_2$ at around 150° C. for one week. After one week, an iridescent film was visible on part of the cut surface. At this time, mechanical difficulties with the department's SEM lead to a delay in characterizing the samples, and in the interim the film on the treated pyrite faded and the sample was lost among other non-treated samples.

Experiments 9 and 10 involved mixtures of the sample powder with solutions of different pH. Note that carbonate formation in solution is expected to be favoured at high (basic) pH. Experiment 9 consisted of 6 g of sample powder with 10 mL of 1% HCl solution under $CO_2$ at room temperature for 10 days, with constant stirring. Experiment 10 consisted of 5 g of tailings powder with 10 mL of 0.01 M NaOH under $CO_2$ at room temperature for 10 days, with constant stirring. The mixtures were allowed to dry overnight uncovered in air. SEM/EDS analyses of both products did not detect any signs of carbonate formation.

In the longer term, high temperature experiments 6B, 7 and 8 it was apparent on opening the Erlenmeyer flask that $CO_2$ had escaped over the course of the experiments (in that a lit match inserted in the flask did not extinguish as it would in a pure $CO_2$ environment). In experiments 9 and 10 the rubber stopper was coated with glycerin, which together with low temperatures improved gas retention. At this point we began looking for a custom-built vessel with a better sealing mechanism.

Experiments 11 and 12 were the first with the new vessel, described above, and were intended as repeats of the simplest experiments with a more reliable seal. In experiment 11, 5 g of dry sample powder were heated at around 250° C. for 9 days under $CO_2$. The vessel appeared to retain the gas over the course of the experiment. Within 50 minutes the entire interior of the vessel was coated with a white film of elemental sulfur, and as the experiment progressed it was noted that the bottom edge of this film moved up the vessel (i.e., away from the heat source). Examination with the SEM/EDS did not show any definite signs of carbonate formation (i.e., strong C peaks or signs of alteration on grains), however quantitative EDS analysis appeared to suggest that many grains contained less S than expected.

Experiment 12 consisted of 2.5 g of sample powder with 10 mL DI water under $CO_2$ at between 50-60° C. for 10 days, with constant stirring. The presence of condensation on the sides of the vessel obscured any signs of elemental sulfur. After 10 days, the mixture was brown-grey, significantly lighter in colour than at the start, although not homogenous; material taken from near the surface of the mixture was darker in colour, closer to that of the unaltered powder. Samples were dried uncovered in air overnight. PXRD of the lightest-coloured material, taken from the middle of the mixture, showed strong lines unambiguously due to cerussite, $PbCO_3$, as well as weaker lines ascribed to smithsonite, $ZnCO_3$, in addition to galena, anglesite, sphalerite and pyrite also present in the unaltered sample powder. No lines attributable to pyrrhotite were detected. SEM/EDS analysis of the sample, however, showed a similar result to that of experiment 11, with the exception of presence of islands of pure (likely amorphous) S sitting on the surface of the dried powder. Those C peaks seen in the EDS were not significantly different from those seen in previous samples, suggesting that EDS is not a reliable method of searching for carbonates.

Experiment 13 was similar to experiment 12, but with 10 ml 0.01 M NaOH instead of water. After 14 days, the colour of the mixture was lighter than the starting material but not as light as in experiment 12. PXRD of the end product again showed strong lines due to cerussite as well as lines attributable to leadhillite, $Pb_4(CO_3)_2(SO_4)(OH)_2$, presumably formed from anglesite as the cerussite is formed from galena. No lines attributable to smithsonite, pyrite or pyrrhotite are detectable. The apparent lack of iron phases in patterns of both experiments 12 and 13 is odd, perhaps suggesting conversion to non-crystalline or poorly-crystalline iron oxyhydroxide phases.

SEM/EDS analysis of experiment 13 was similar to experiment 12 but without any S islands. The sample did however show several large (100-200 μm) sprays of calcium-rich crystals, which EDS suggests are calcium sulfate. The shapes of the crystals appear as if they had grown in place on the powder. The PXRD pattern also showed small peaks from gypsum, $Ca(SO_4)(H_2O)_2$. A small number of similar crystals were also seen in experiment 12, but in experiment 13 they were larger and more numerous.

Experiment 14 repeated experiment 12 as closely as possible to check for the repeatability of carbonate formation. The temperature and appearance of the mixture was monitored continuously over the 10 day run. After 2 days the colour of the mixture had lightened noticeably and after 7 days brown particles could occasionally be observed splashing on the side of the vessel. On opening the mixture was not as light in colour as experiment 12 was, but was still lighter than the starting material. The mixture was again dried in air, but this time partly covered in the fumehood rather than open in the lab to reduce possible contamination by dust.

PXRD patterns were measured for material from both the bulk of the mixture, near the surface of the mixture, and material scraped or washed from the sides. The bulk material and that from the sides were very similar and all show patterns from the Pb carbonates cerussite and leadhillite, as well as galena, anglesite and sphalerite. The pattern from the surface material showed very strong lines from gypsum (hydrated $CaSO_4$) as well as lines from elemental sulfur, anhydrite (water-free $CaSO_4$), lead oxide and chabazite (Ca-bearing silicate). Well-formed crystals of elemental sulfur were also observed with the SEM. While the CPB-2 powder is reportedly Ca-poor, the consistent appearance of a chabazite line at low angles in the PXRD patterns in both reacted and unreacted material suggests that Ca is present in the system, and chemically active in the formation of sulfates.

Experiment 15 consisted of 2.5 g of ground pyrite powder with 10 mL DI water under $CO_2$ at between 50-60° C. This experiment was scheduled to run for 10 days, much like experiments 12-14, but was stopped after approximately 3 days when the acidic solution formed caused corrosion of the thermocouple wire. PXRD of the products showed formation of rozenite, hydrated $Fe(SO_4)$, a ferrous oxyhydroxide phase analogous to gibbsite, and minor amounts of elemental arsenic, likely liberated from the pyrite.

Experiment 16 and following were run with a standardized tailings powder, RTS-3A, also obtained from Natural Resources Canada. RTS-3A is sample of sulfide mill tailings obtained from Waite Amulet Mine, near Noranda, QC, Canada. The mineral species contained include 16.6% pyrrhotite and 5.0% pyrite in addition to a variety of common silicate mineral phases (elemental composition Fe 20.5%, Si 18.3%, S 9.6%, Al 5.1%, Mg 2.5%, Ca 2.1%, other elements <1%; note that a $C/CO_2$ content of 0.04% is reported for this material). This experiment was run with 2.5 g of the new RTS-3A powder as well as 10 mL of deionized water. The experiment was once again run under $CO_2$ and kept at a temperature ranging from 50-60° C. for four days. After two days, the solution began to develop an orange hue, which intensified throughout the day; the solution also became significantly lighter in colour. On the fourth day, the thermocouple was no longer functioning. Upon further inspection, it was discovered that it had been corroded; likely due to acid formation in the solution which had a pH of 3.1 approximately five minutes after the vessel was opened. Samples from the bulk material as well as those from the material washed from the sides of the vessel were analyzed under PXRD. While results from the PXRD of the products showed no formation of carbonates, it did show peaks for goethite (FeOOH), which explained the colour change, as well as peaks corresponding to elemental sulfur. It appears as though pyrite had replaced pyrrhotite as the primary iron oxide as there were no pyrrhotite peaks found in the samples taken from after the experiment was run.

In an effort to minimize acid production, experiment 17 was run using 2.6 grams of RTS-3A without the addition of any water. The experiment was run under $CO_2$ at an average of 200° C. for five days. Within the first 10 minutes of the experiment, a white film formed around the base of the vessel which slowly spread while some of it, near the base, turned from white to bright yellow. After approximately 30 minutes, the entire inside of the vessel was covered by a white film, with some yellow persisting near the bottom. Approximately one hour after the commencement of the experiment, the yellow had begun to fade. By the 1.5 hour mark, the yellow colouring had more or less disappeared. By the end of the experiment, the sulfur seemed to have condensed from a thick diffuse coating to a thinner, patchier coating with some well-defined crystals visible to the naked eye. After five days, the heat was shut off and the experiment was left to cool for 1.5 hours until the temperature had dropped to 27° C. at which point it was removed and the vessel was opened. While the powder itself seemed to initially darken in colour as the sulfur film formed, at the end of the experiment, as it cooled to room temperature, it seemed to grow lighter. The final product was noticeably lighter and redder in colour than the unaltered powder. Two powder slides were made for the PXRD, one was a slide of the bulk powder, and the other was made from the white film covering the sides of the vessel. Amongst the many minerals matched for this experiment using the PXRD, results showed that the bulk powder contained magnetite peaks as well as patterns correlating to both pyrite and pyrrhotite peaks. Anhydrite ($CaSO_4$) was also found in this sample. As hypothesized, the results from the white film showed a strong elemental sulfur pattern. Unfortunately, the results showed no carbonate formation.

Experiment 18 was run as a variation of experiment 17; the same parameters were followed (2.5 g of RTS-3A powder, under $CO_2$ at approximately 200° C.), except that this experiment was only to be run for one hour. Once again, after approximately 10 minutes, white film followed by a yellow film around the base was seen. After approximately 20 minutes, and once the yellow colouring was quite prominent, the heat was turned off. The experiment was cooled for half an hour down to 32° C., during this time, the yellow colouring had essentially disappeared. Nearly one hour after the experiment had begun, the vessel was opened. The solution had a rather pungent odour upon the opening of the vessel. The final product was only slightly lighter and redder in colour than the unaltered powder. A sample of the bulk powder was prepared and analyzed through the PXRD. Results showed that the powder once again contained magnetite as well as both pyrrhotite and pyrite, additionally peaks for bassanite [$(CaSO_4).0.67H_2O$] were also identified. There was no carbonate formation evident from the results.

It should be noted that the unaltered RTS-3A powder as well as the reacted product of both experiments 17 and 18 contained calcium sulfates which varied in their $H_2O$ content. While the unaltered RTS-3A powder contained gypsum [$(CaSO_4).2H_2O$], after it was put under heat and $CO_2$ for one hour (experiment 18), it contained bassanite [$(CaSO_4).0.67H_2O$]. After 5 days under heat and $CO_2$, only anhydrite ($CaSO_4$) was present. It appears as though the calcium sulfates are being dehydrated throughout the length of the experiments.

Experiments 19 and 20 consisted of 1.0 g of RTS-3a powder with 10 mL 1 M NaOH solution under $CO_2$ at 50-60° C., for 24 and 72 hours respectively. The strong basic solution was substituted for plain water in order to ameliorate the effects of acid production through sulfide oxidation seen in the previous experiments, and to encourage carbonate formation (as most carbonate phases prefer a basic environment). In both experiments the mixture started a muddy brown-grey colour; within 24 hours a bright orange ring formed on the glass at the top edge of the mixture and the colour of the mixture had grown noticeably lighter; after about 48 hours the entire mixture had turned quite orange and the ring on the glass was turning red. On opening the vessel, in both experiments the measured pH was still above 8.

As the mixture was dried in air, white-to-yellow crystallites formed among the tailings material. These proved to be various sodium carbonate and bicarbonate salts which precipitate from the NaOH solution itself. This shows that the basic solution does readily absorb $CO_2$ from the air and that carbonate ions should be present in the system.

PXRD patterns of both experiments were similar and show the presence of elemental S, Fe sulfate phases (mostly melanterite $Fe(SO_4).7H_2O$), ferric oxides goethite FeOOH and ferrihydrite, and strong lines from the sodium carbonate salts. Despite the presence of carbonate in the system, there is no indication of carbonates forming with iron.

Experiment 21 was a dry experiment where 1.0 g of powdered pyrite under $CO_2$ was heated at 200-230° C. for 24 hours. This was to parallel experiments 17 and 18 where the RTS-3a tailings powder was similarly treated. In those experiments, elemental sulfur quickly formed on the side of the vessel (within 15 minutes). In experiment 21, we observed no sulfur film forming, even after 24 hours; this shows that it is pyrrhotite and not pyrite in previous experiments that releases sulfur. The pyrite powder darkened in colour slightly and on opening the vessel there was a strong pungent odour, possibly of $SO_2$. PXRD patterns showed very small peaks due to some $FeSO_4$ phase (melanterite was the best match, although there should not have been any water in the system) in addition to pyrite.

Experiment 22 was intended to repeat the same conditions as in experiments 19 and 20, 1.0 g of RTS-3a powder with 10 mL 1 M NaOH solution under $CO_2$ at 50-60° C., but for a longer time. In this experiment the temperature was not monitored with thermocouple wire, as the hotplate being using had proved to consistently heat to 50-60° C., and we hoped to avoid losing another wire to acid corrosion. After 24 hours, the mixture had turned very dark grey to black, unlike experiments 19 and 20 after the same period. After one week the mixture was still very dark, with an orange oxide ring had on the glass near the edge of the liquid. The pH measured at the end was still around 8. PXRD patterns showed largely the same set of products as in experiments 19 and 20, but with the addition of several small lines that appeared to be best matched by siderite, $FeCO_3$.

This experimental work, in particular experiments 12, 13, 14, and 22, demonstrate that carbonates can be successfully produced using the process described and claimed herein.

TABLE 2

Summary of Experiments

| Experiment | Container | Material | Mass (g) | Solution | Stirring | Gas | Temperature (°C.) | Time (h) | Products |
|---|---|---|---|---|---|---|---|---|---|
| 1 | Erlenmeyer | CPB-2 | 20 | 50 ml DI water | Yes | $CO_2$ 20 s fill | RT (24) | 120 | Fe oxyhydroxides |
| 2 | Erlenmeyer | CPB-2 | 10 | 50 ml DI water | Yes | $CO_2$ 20 s fill | RT | 120 | |
| 3 | Erlenmeyer | CPB-2 | 10 | dry | N/A | $CO_2$ 20 s fill | 150 | 48 | S |
| 4 | Erlenmeyer | CPB-2 | 10 | dry | N/A | air | 150 | 48 | S |
| 5 | Erlenmeyer | CPB-2 | 10 | 2 ml DI water | No | air | 150 | 48 | S |
| 6A | Erlenmeyer | CPB-2 on glass slide | ≤1 | dry | N/A | $CO_2$ 30 s fill | 150 | 24 | |
| 6B | Erlenmeyer | CPB-2 on glass slide | ≤1 | dry | N/A | $CO_2$ 30 s fill | 150 | 168 | |
| 7 | Erlenmeyer | pyrite crystal | | dry | N/A | $CO_2$ 30 s fill | 150 | 168 | Iridescent film on cut, polished section |
| 8 | Erlenmeyer | CPB-2 on glass slide | ≤1 | dry | N/A | $CO_2$ 30 s fill | 300 | 336 | |
| 9 | Erlenmeyer | CPB-2 | 6 | 10 ml 1% HCl | Yes | $CO_2$ 30 s fill | RT | 240 | |
| 10 | Erlenmeyer | CPB-2 | 5 | 10 ml 0.1M NaOH | Yes | $CO_2$ 30 s fill | RT | 240 | |
| 11 | Custom | CPB-2 | 5 | dry | N/A | $CO_2$ 30 s fill | 250 | 216 | S |
| 12 | Custom | CPB-2 | 2.5 | 10 ml DI water | Yes | $CO_2$ 60 s fill | 55 | 240 | $PbCO_3$, $ZnCO_3$ |
| 13 | Custom | CPB-2 | 2.5 | 10 ml 0.1M NaOH | Yes | $CO_2$ 60 s fill | 55 | 336 | $PbCO_3$, $Pb_4(CO_3)_2(SO_4)(OH)_2$ |
| 14 | Custom | CPB-2 | 2.5 | 10 ml DI water | Yes | $CO_2$ 60 s fill | 55 | 240 | $PbCO_3$, $Pb_4(CO_3)_2(SO_4)(OH)_2$ |
| 15 | Custom | pyrite powder | 2.5 | 10 ml DI water | Yes | $CO_2$ 60 s fill | 55 | 68 | $Fe(SO_4) \cdot 4H_2O$, $Fe(OH)_3$ |
| 16 | Custom | RTS-3a | 2.5 | 10 ml DI water | Yes | $CO_2$ 60 s fill | 55 | 96 | FeOOH, S |
| 17 | Custom | RTS-3a | 2.5 | dry | N/A | $CO_2$ 60 s fill | 200 | 120 | S |
| 18 | Custom | RTS-3a | 2.5 | dry | N/A | $CO_2$ 60 s fill | max. 220 | 1 | S |
| 19 | Custom | RTS-3a | 1.0 | 10 ml 1M NaOH | Yes | $CO_2$ 60 s fill | 55 | 24 | FeOOH, S, $FeSO_4 \cdot nH_2O$, ferrihydrite, Na carbonate salts |
| 20 | Custom | RTS-3a | 1.0 | 10 ml 1M NaOH | Yes | $CO_2$ 60 s fill | 55 | 72 | FeOOH, S, $FeSO_4 \cdot nH_2O$, ferrihydrite, Na carbonate salts |
| 21 | Custom | pyrite powder | 1.0 | dry | N/A | $CO_2$ 60 s fill | 200-230 | 24 | $SO_2$ gas, $FeSO_4 \cdot nH_2O$, |

TABLE 2-continued

Summary of Experiments

| Experiment | Container | Material | Mass (g) | Solution | Stirring | Gas | Temperature (°C.) | Time (h) | Products |
|---|---|---|---|---|---|---|---|---|---|
| 22 | Custom | RTS-3a | 1.0 | 10 ml 1M NaOH | Yes | $CO_2$ 60 s fill | 55* | 168 | FeOOH, S, $FeSO_4 \cdot nH_2O$, ferrihydrite, $FeCO_3$, Na carbonate salts |
| 22B | Custom | RTS-3a | 1.0 | 10 ml 1M NaOH | Yes | $CO_2$ 60 s fill | 55* | 168 | S, $FeSO_4 \cdot nH_2O$, ferrihydrite, $Fe(OH)_3$, Na carbonate salts |

I claim:

1. A process for stabilizing a waste material rich in a metal-sulfate compound and/or rich in a metal-sulfide compound which comprises:
  exposing the waste material to a $CO_2$-enriched gas mixture,
  reacting the $CO_2$-enriched gas mixture with the metal-sulfate and/or metal-sulfide compound; and
  forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

2. The process of claim 1 wherein the $CO_2$-enriched gas mixture is sourced from at least one of a commercial and industrial $CO_2$ emitting source.

3. The process of claim 1 wherein the $CO_2$-enriched gas mixture comprises >1% by weight of $CO_2$.

4. The process of claim 1 wherein the $CO_2$-enriched gas mixture comprises $CO_2$ and at least one of $O_2$, $N_2$ and/or $SO_2$.

5. The process of claim 1 wherein the $CO_2$-enriched gas mixture is sourced from one of a fossil fuel-based hydrogen production plant and a biomass energy facility which is $CO_2$-generating.

6. The process of claim 1 wherein the $CO_2$-enriched gas mixture is sourced from at least one of a power plant, a lime kiln, a cement plant, a hydrocarbon-fueled electrical power generation facility, a heating plant, a natural gas processing plant, and a synthetic fuel plant.

7. The process of claim 1 wherein the waste material is selected from the group consisting of surface overburden, non-ore rock, lean ore, tailings, and hydrometallurgical residues.

8. The process of claim 1 wherein the waste material is at least one of dry and wet mine tailings.

9. The process of claim 1 wherein the waste material comprises at least one of the following: pyrite, pyrrhotite, marcasite, arsenopyrite, argentite, chalcopyrite, cinnabar, galena, molybdenite, pentlandite, realgar, sphalerite, and stibnite.

10. The process of claim 1 wherein the purified metal is a metal rich compound comprising at least one concentrated and/or purified metals selected from the group consisting of lead, zinc, copper and iron.

11. The process of claim 1 wherein the waste material is at substantially standard temperature and pressure (STP) when initially exposed to $CO_2$-enriched gas mixture in a reaction zone.

12. The process of claim 1 wherein, in a reaction between the waste material and the $CO_2$-enriched gas mixture in a reactor or reaction zone, a temperature is selected from one of the following:
  a) up to about 500° C.,
  b) up to about 400° C.,
  c) up to about 300° C.,
  d) up to about 200° C., or
  e) up to about 150° C., and
at a pressure is selected from one of the following:
  a) up to about 10 atmospheres,
  b) up to about 7 atmospheres,
  c) up to about 5 atmospheres, or
  d) up to about 2 atmospheres.

13. The process of claim 1 wherein said reacting comprises a reaction between the $CO_2$-enriched gas mixture and the metal-sulfate and/or metal sulfide compound, wherein said reaction occurs in one of i) a reactor or ii) a reaction zone, and wherein the reaction zone is selected from: i) an in situ waste site and ii) two or more counter-current cells.

14. A process for stabilizing a waste material rich in a metal-sulfate compound and/or rich in a metal-sulfide compound which comprises:
  (a) contacting the waste material comprising the metal-sulfate compound and/or the metal-sulfide compound with a $CO_2$-enriched gas mixture in a reaction zone to produce a reaction mixture;
  (b) recovering from the reaction mixture metal by-products; and
  (c) separating and recovering one or more of sulfuric acid, sulfur, hydrogen sulfide, sulfur dioxide, sulfur trioxide and sulfurous acid from the reaction mixture.

15. An apparatus for processing mine and industrial waste materials rich in a metal-sulfate compound or rich in a metal-sulfide compound, said apparatus comprising:
  (a) a reactor/reaction zone comprising mine or industrial waste material, wherein the waste material comprises at least one of crushed or ground waste rock, dry tailings, wet tailings, ore stockpiles, or other sulfate-rich and/or sulfide-rich waste materials;
  (b) a feed line into the reactor/reaction zone, for delivery of a $CO_2$-enriched gas mixture;
  (c) a feed line for water and other reactants; and
  (d) means to separate solid and liquid reacted products.

16. The apparatus of claim 15 comprising at least one of the following:
  (a) a heat exchanger to control a temperature of water and other reactants;
  (b) a heat exchanger to lower or elevate a temperature of the $CO_2$-enriched gas mixture;
  (c) a reactor which separates $H_2SO_4$ from the liquid reacted products;
  (d) a reactor which produces elemental sulfur from the liquid reacted products;

(e) a purifier which produces either concentrated metal in solution or solid metal products;
(f) a pressure release system which allows collection of any reacted gas products; or
(g) a scrubber which removes $H_2S$, $SO_2$ or $SO_3$ gas from said reacted gas products.

17. The apparatus of claim 15 comprising at least one of the following:
   (a) a reactor which separates Sulfuric Acid ($H_2SO_4$) from liquid reacted products;
   (b) a reactor which produces elemental sulfur from liquid reacted products;
   (c) a purifier which produces either concentrated metal in solution or solid metal products;
   (d) a crushing and grinding circuit which can produce fine-grained material from a feed stream of varying size;
   (e) a scrubber which removes Hydrogen Sulfide ($H_2S$), Sulfur Dioxide ($SO_2$) or Sulfur Trioxide ($SO_3$) gas from reacted gas products.

18. A system for stabilizing a waste material rich in a metal-sulfate and/or rich in a metal-sulfide compound and adapted to contain an in situ process, wherein a reaction zone is a contained in situ waste site, said system comprising:
   (a) a source of sulfide-rich mine or industrial waste material rich in a metal-sulfate and/or rich in a metal-sulfide, said source being located in one of i) a heap and ii) pile on a non-permeable liner;
   (b) a series of pipes/lined trenches for draining a reacted liquid product off the non-permeable liner;
   (c) a vessel for storing reacted liquid product;
   (d) a cap/cover to trap injected gas;
   (e) a source of a $CO_2$-enriched gas mixture;
   (f) water and other reactants;
   (g) a pipe system beneath the cap/cover to distribute water and reactants on the heap/pile; and
   (h) a pipe system to inject the $CO_2$-enriched gas mixture into the waste material wherein $CO_2$-enriched gas mixture may combine with the waste material, water and other reactants.

19. The system of claim 18 wherein said reaction zone consists of a heap/pile and wherein reactions occur at either one of i) STP and ii) an elevated temperature up to about 250° C. and/or elevated pressure up to about 5 atmospheres.

20. A process for stabilizing a waste material rich in a metal-sulfate and/or rich in a metal-sulfide compound which comprises:
   exposing the waste material to a $CO_2$-enriched gas mixture in a reactor/reaction zone, wherein said reactor/reaction zone comprises at least two counter-current cells and wherein waste material, reagents and/or water flow into a first cell in sequence, then proceed onwards in a first direction through a series of latter cells to a last cell and wherein $CO_2$-enriched gas mixture flow in a second opposite direction in counter-current to the first direction, such that $CO_2$-enriched gas mixture enters the last cell and proceeds to the first cell, said process forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

21. A process for sequestering CO2, comprising:
   providing a material comprising a metal-sulfate compound and/or a metal-sulfide compound;
   exposing the material to a $CO_2$-enriched gas mixture comprising $CO_2$ to be sequestered;
   reacting the $CO_2$-enriched gas mixture with the metal-sulfate and/or metal-sulfide-rich compound; and
   forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

* * * * *